United States Patent [19]

Keem et al.

[11] 4,123,197

[45] Oct. 31, 1978

[54] FAN WITH AIR DIRECTING GRILLE

[75] Inventors: Phillip W. Keem, North Croydon; Laimons Kaimins, Forest Hill; James Graham, Eltham, all of Australia

[73] Assignee: Allware Agencies Limited, London, England

[21] Appl. No.: 765,764

[22] Filed: Feb. 4, 1977

[51] Int. Cl.² .......................... F16D 7/00; F16D 63/00
[52] U.S. Cl. .................................... 415/123; 64/30 E; 188/82.77; 188/82.3; 192/41 S; 192/56 C; 417/423 R
[58] Field of Search .......................... 415/123; 64/30 E; 192/41 S, 56 C; 417/423 R; 188/82.77, 82.3

[56] References Cited
U.S. PATENT DOCUMENTS

| 1,615,804 | 1/1927 | Starkey | 192/41 S |
| 3,395,553 | 8/1968 | Stout | 192/41 S UX |

FOREIGN PATENT DOCUMENTS 459,701   3/1975   Australia ....................... 417/234

Primary Examiner—Carlton R. Croyle
Assistant Examiner—Donald S. Holland
Attorney, Agent, or Firm—Fitch, Even, Tabin & Luedeka

[57] ABSTRACT

A clutch mechanism suitable for connecting a rotatable member to an output shaft of a motor, which mechanism comprises a body which is attachable to the output shaft and a resilient arm, one end of which is fixed to the body the other end of which is capable of engaging the rotatable member or part thereof, wherein the body is capable of gripping the output shaft in secure frictional contact to transfer rotational drive from the output shaft to the rotatable member only when the rotatable member is not restrained against rotation.

3 Claims, 3 Drawing Figures

FAN WITH AIR DIRECTING GRILLE

BACKGROUND OF THE INVENTION (i) Field of the Invention

The present invention relates to a slipping clutch mechanism suitable for use in stationary head fans which provide a gyratory distribution pattern of air flow.

(ii) Description of the Prior Art

The specification of Australian Pat. No. 459,701, describes and claims a fan in which the fan head remains stationary but which is capable of delivering air in a substantially gyratory distribution pattern. The term "gyratory distribution pattern" is intended to indicate an air flow distribution pattern which is substantialy the same as that produced by a fan with a gyratory head, except that the flow is more laminar and less spiral. The fan described in the above patent specification is broadly defined as comprising a fan blade assembly, an electric motor for driving the fan blade assembly, means to render the air flow from the blade assembly wholly axial, and an air directing grille mounted in the path of the flow of air from the blade assembly and said means, and driven by the motor to rotate at a speed less than the blade assembly speed, said grille including a plurality of louvres arranged parallel to and at different acute angles to the flow of air, such that the air flow is directed by the grille in a substantially gyratory distribution pattern.

The fan particularly described in the specificaton of Australian Pat. No. 459,701 includes a clutch mechanism which operates to disconnect drive to the grille in the event that rotation of the grille is obstructed. The mechanism described in the specification of Australian Pat. No. 459,701 comprises three spring steel leaf springs which extend rearwardly from equiangularly disposed locations at the rear of a central hub incorporated into the grille, the grille, and thus the hub, also being mounted for movement coaxially of a drive shaft of the electric motor for the fan. The latter motor drive shaft is fitted with a coaxial clutch ring and the grille is mounted such that it can be moved from a forward non-driving disposition, at which free rear ends of the springs are forwardly disposed of and clear from the clutch ring, to a rearward location to engage drive to the grille. During this rearward movement, the free ends of the springs initially engage a peripheral, sloping, cam surface on the forward end of the clutch ring to force the free ends radially apart, whereupon, after further rearward movement the free ends ride over this cam surface to be engaged in a peripheral annular groove on the clutch ring. The groove is sinuously configured at its root so as to define a plurality of radially inwardly extending notches therein, these notches being equispaced around the axis of the drive shaft and being separated by radially outwardly extending crests in the root. The free rear ends of the springs enter appropriately positioned ones of these notches and so key the hub and clutch ring together to rotate the grille together with the drive shaft. In the event that rotation of the grille is obstructed whilst the clutch mechanism is so engaged, the drive shaft can still continue to rotate without transmitting excessive driving force to the grille, the free ends of the springs merely being repetitively forced outwardly against the resilient bias thereof, by camming action as the free ends are engaged by successive crests of the groove root. Whilst this clutch mechanism is quite satisfactory in use, it does suffer the disadvantage that it is relatively complex in construction, for an item intended to be mass-produced, so that there is an undesirable cost component introduced into the overall price of the fans due to the labour intensive nature of the assembly operations of the clutch. In particular, in the construction described in the specification of Australian Pat. No. 459,701 assembly of the clutch mechanism requires the following operations:

Firstly, the leaf springs are individually screwed onto the hub and the clutch ring is assembled onto the motor drive shaft. Then, with the hub located in position to extend coaxially of the drive shaft and with the free end portions of the springs fitted into the notches of the grooves of the clutch ring, a screw is inserted through an opening in a transverse wall of the hub to extend into a threaded bore in the shaft, this being to prevent the grille from leaving the shaft under forward pressure of air displaced by the fan.

It will be appreciated that these assembly operations are difficult to automate.

Aside from the above, the mechanism described in the specification of Australian Pat. No. 459,701 may occasionally fail by virtue of the working loose of the screw holding the hub to the shaft, and whilst this difficulty may be avoided by routine inspection, the arrangement is not so completely satisfactory as is desirable.

BRIEF SUMMARY OF THE INVENTION

According to one aspect of the present invention there is provided a clutch mechanism suitable for connecting a rotatable member to an output shaft of a motor which mechanism comprises a body which is attachable to the output shaft and a resilient arm, one end of which is fixed to the body, the other end of which is capable of engaging the rotatable member or part thereof, wherein the body is capable of gripping the output shaft in secure frictional contact to transfer rotational drive from the output shaft to the rotatable member only when the grille is not restrained against rotation.

According to another aspect of the invention there is provided a clutch mechanism comprising first and second coaxially mounted and axially rotatable members, the first member carrying a drive transfer element in the form of a helical spring coaxially mounted over an axially extending portion of said first member, with the inner surface portion of the spring element frictionally engaged with the outer surface of said axially extending portion for transfer of rotational movement of the first member to the spring, the helical spring having an end portion which extends outwardly of the axis of the first member, the second member having an abutment positioned to be engaged by said end portion of the spring, during rotation of the first member and spring, to rotate the second member therewith, the frictional coupling between the spring and said axially extending portion of said first member being such as to permit said first member to rotate, in at least one direction, without imparting rotational movement to the spring when a predetermined restraint of rotation of the second member is applied.

Preferably, said at least one direction is a first direction tending to unwind said helical spring when said end portion is obstructed whereby, when the first member rotates in said first direction and said second member is held against rotation, pressure of the end portion of said spring against said abutment due to rotation of the first member loosens said coupling between the spring and said axially extending portion, by partly unwinding the spring, to permit the first member to maintain rotation without rotating the spring. Said arm may be resilient whereby, when said second member is held stationary and said first member is rotated in a second direction tending to wind up said spring and increase the frictional coupling between the spring and said axially extending portion, said end portion of said spring is resiliently deformed to pass said abutment to permit continued rotation of the first member, and when said second member is caused to rotate more quickly than said first member, similar deformation of said end portion occurs.

Said first member may comprise a shaft having a cylindrical outer surface defining said axially extending portion. In this case, the shaft preferably has a groove into which at least one of the convolutions of said helical spring is at least partially engaged to restrict axial movement of the spring relative to the shaft.

In another aspect the invention provides a fan comprising a fan blade assembly, a motor for driving the fan blade assembly, means to render the air flow from the blade assembly more axial, and an air directing grille mounted in the path of the air flow from the fan blade assembly and said means, a clutch mechanism operable to couple a first member which is, in use of the motor, axially rotatable thereby and a second coaxially mounted member carried by the grille for rotating or allowing rotation of the second member grille at a speed less than the blade assembly speed, said grille including a plurality of louvres arranged to direct the air flow in a substantially gyratory distribution pattern; said clutch mechanism including said members, and a drive transfer element in the form of a helical spring coaxially mounted over an axially extending portion of said first member, the inner surface portion of the spring element being frictionally engaged with the outer surface of said axially extending portion for transfer of rotational movement of the first member to the spring, the helical spring having an end portion which extends outwardly of the axis of the first member, the second member having an abutment positioned to be engaged by said end portion of the spring, during rotation of the first member and spring, to cause or permit rotation of the second member therewith, the frictional coupling between the spring and said axially extending portion being such as to permit said first member to rotate, in a given direction of rotation of said grille and first member, without imparting rotational movement to the spring when a predetermined restraint of rotation of the second member is applied.

When the air flow through the grille has a substantial gyratory component, a rotational component will be imparted to the grille which component may tend to cause the grille to rotate faster than said first member. In such circumstances the clutch mechanism preferably acts as a governor wherein said end portion of said spring has sufficient strength to restrain said second member by engagement of said end portion with said abutment.

Preferably said second member is a hub of said grille, the grille being movable axially of said first member and the fan having an annular casing portion which is engageable by an outer annular portion of the grille, upon axial movement of the hub in one direction from a position at which the clutch mechanism is free to drive the grille; releasable locking means being provided operable to maintain said annular portion and casing portion so engaged to apply at least said predetermined restraint to the first member to permit locking of the grille without switching off said motor.

The invention is further described with reference to the accompanying drawings.

DETAILED DESCRIPTION

Figure 1:
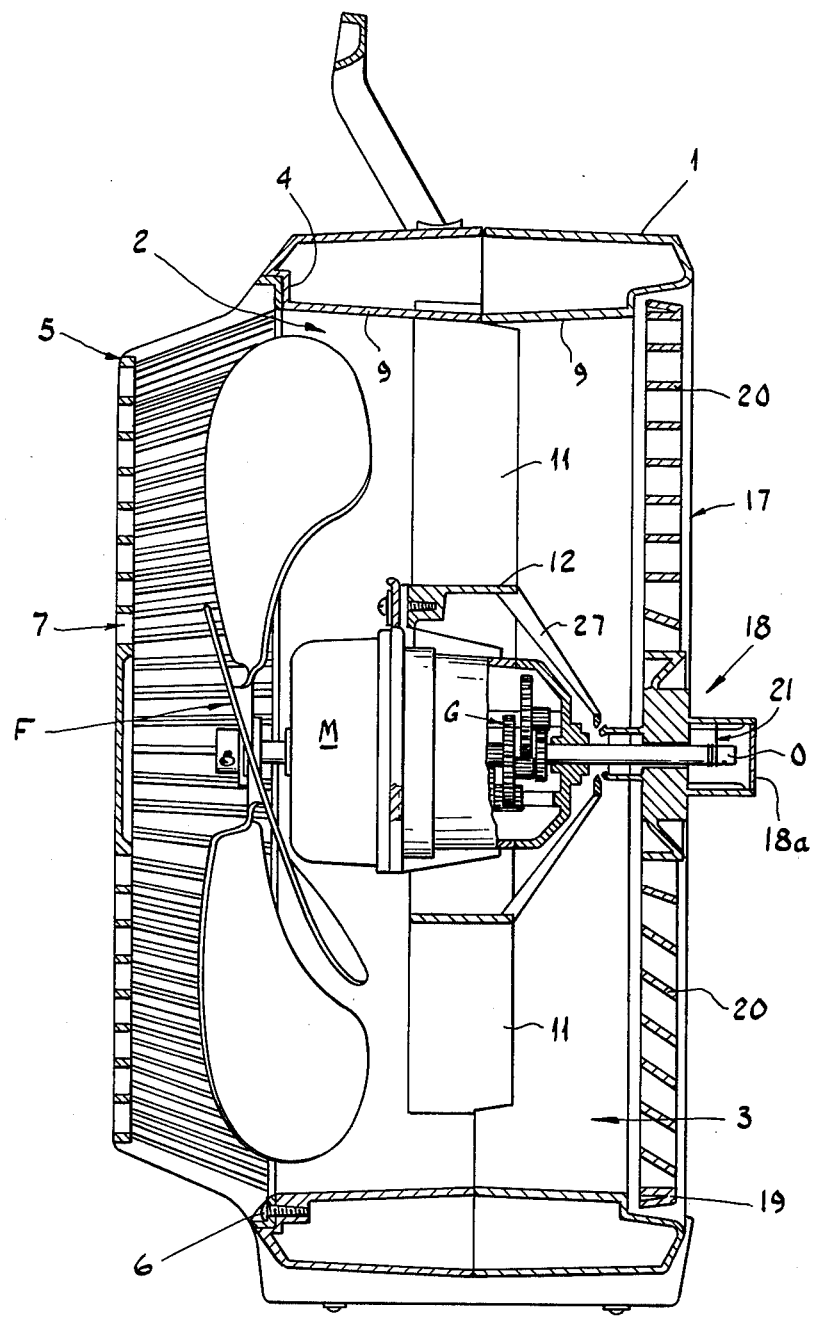
FIG. 1 is a vertical axial section of a fan incorporating a clutch mechanism constructed in accordance with the invention.

The fan shown in the drawings comprises a two-part moulded plastic casing 1, having a passage 9 therethrough thus communicating with an air inlet opening 2 at the rear face of the casing, and an air outlet opening 3 at the front face of the casing. The casing is formed with an annular recess 4 surrounding the inlet opening 2, and this receives the base of a moulded plastic cage 5, which is held to the casing by screws 6, the cage 5 having a plurality of air intake openings 7 therethrough. The motor M for the fan is supported within passage 9, being affixed to a plastic surrounding 12 carried by radial vanes 11 extending between the surrounding and the passage 9. Motor M has an output shaft extending from either end thereof and the end directed towards the inlet 2 supports a fan blade assembly F. The other output shaft is connected to a reduction gear box G enclosed within the motor body and having a coaxial output shaft O. The output shaft supports a circular air directing grille 17, which is longitudinally slidable on and rotatable with respect to the shaft O. The grille 17 has a central hub 18 mounted on the shaft O and a concentric peripheral rim 19 between which a plurality of parallel louvres 20 are connected. The louvres 20 are arranged in groups which are disposed at different acute angles to the direction of air flow from the vanes 11. The grille is formed as an integral plastic moulding.

The applicant has found that a grille of the following construction is satisfactory: The central hub is about two inches in diameter and the rim is about thirteen inches in diameter. The louvres are arranged in three groups: a first group of six louvres positioned near one section of the rim and disposed at 0° to the direction of air flow; a second group of seven louvres disposed at 15° to the direction of air flow, and a third group of six louvres disposed at 30° to the direction of air flow, there being a slightly larger spacing between the groups than between adjacent louvres within the groups. Hub 18 has a forwardly projecting annular skirt 23 which extends in spaced concentric relationship around shaft O. The inner surface of skirt 23 has a plurality of axially extending ribs 24 arrayed therearound, these each extending a short distance radially inwardly towards the axis of shaft O. A helical spring 21 is wound around shaft O within skirt 23. This is a relatively tight fit on the shaft and is axially located in position on the shaft by partial engagement of one of the convolutions of the spring within a peripheral groove 22 on the shaft.

One end of the spring 21 extends radially outwardly of the shaft O to form an arm 16 the free end of which is spaced only a short distance inwardly from the inner surface of skirt 23, such that rotation of shaft O can cause concomitant rotation of hub 18 and thus of grille 17, by reason of the spring being carried around with the shaft as it rotates to cause the free end of arm 16 to engage one of the ribs 24 to transmit driving force thereto. In the present construction, the passage of air through the grille imparts rotational energy to the grille such that the grille has a tendency to rotate faster than the shaft O, even at low fan blade speeds. Thus during operation of the present constuction, engagement of the arm 16 with one of the ribs 24 restrains the grille and only permits it to rotate at a speed which is substantially that of the shaft O.

Figure 2:
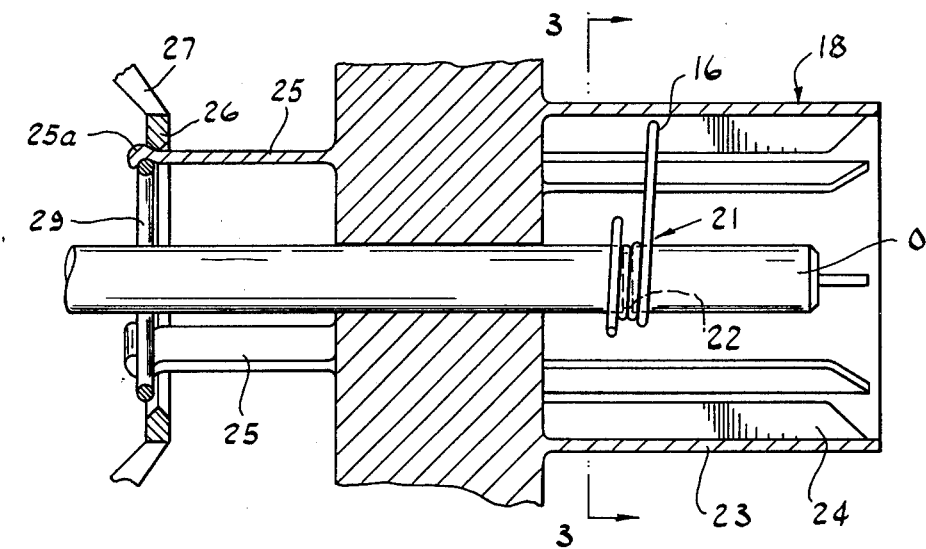
FIG. 2 is an enlarged fragmentary axial section of part of the fan of FIG. 1, showing details of the clutch mechanism incorporated therein.

Grille 17 is axially movable on shaft O from the position shown in FIG. 1, at which driving of the grille will be effected as described, to the position shown in FIG. 2 at which driving is prevented. The movement from the driving to the non-driving positions is effected by pushing inwardly on hub 18 to bring the rim 19 of the grille into engagement with an annular portion of casing 1 located immediately therebehind. Grille 17 can be locked in this position by exerting sufficient pressure on the hub to inwardly deflect the inner portion of the grille further towards the rear of the fan, this deflection being possible because of the resilience of the grille 17. This action causes interengagement between three rearwardly extending prongs 25, on hub 18, and a ring 26 supported concentrically of shaft O by a plurality of struts 27 which interconnect the ring and surrounding 12. Prongs 25 are resilient and have outwardly directed beads 25a at their free ends, these being disposed to cooperate with the inner periphery of ring 26 to effect the locking. Thus, as hub 18 is pushed rearwardly, sloping leading surfaces of the beads 25a engage an annular inwardly sloping surface portion on ring 26 to inwardly deflect the prongs by cam action. Further rearward movement causes the beads to pass to the rear side of the ring 26 whereupon they can spring apart slightly, trailing surfaces of the beads then cooperating with a rear annular surface portion of the ring 26 to prevent the hub moving forwardly. In this condition, the ring 19 is held firmly in engagement with the casing 1. The grille can be moved from this position to restore it to that shown in FIG. 1 simply by pulling on skirt 23 of hub 18 to inwardly deflect prongs 25 by camming engagement with the ring 26, whereby the beads 25a of the prongs can pass forwardly through the ring 26. Although the prongs 25 are naturally resilient a circular spring 29 is mounted to bear against inner surfaces of these, at the free ends, to assist resilient action of the prongs.

Figure 3:
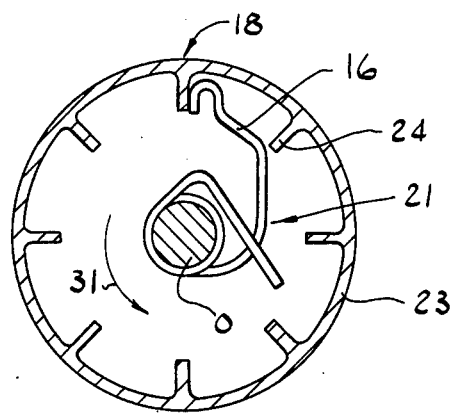
FIG. 3 is a cross section on the line 3—3 in FIG. 2.

In the position of FIG. 2, the grille 17 is locked and will not rotate because of the secure locking effected by the frictional engagement between the rim 19 of the casing and the frictional engagement between the prongs 25 and rings 26. However, this does not cause any excessive loading on the motor M since the direction of rotation of the shaft O is, as shown by arrow 31 in FIG. 3, arranged such that the frictional coupling between spring 21 and the shaft O causes partial unwinding of the spring. This partial unwinding is slight but is sufficient to greatly reduce the frictional coupling between the spring and shaft so that, with grille 17 locked, and the free end of arm 16 abutting a rib 24, there is only slight resultant loading on the motor. Similarly, when the grille 17 is in the condition of FIG. 1, and being rotated, any obstruction to the grille, which might for example be caused by interference with the fan by a user, the spring 21 will again tend to be unwound so that no overloading of the motor will occur. This also ensures that it is not possible to transfer great turning forces from the shaft to the grille, which forces causes injury to persons who might inadvertently catch themselves on the grille.

The arrangement of the clutch means provided by spring 21, shaft O and hub 18 is also such that any attempt by a user to turn the grille 17 in the same direction as the turning of the shaft O, but at a faster rate, will not result in transmission of excessive forces through the grille to the shaft. Thus, it will be observed that arm 16 is of somewhat spiral configuration with a trailing free end which is so disposed that, when grille 17 is turned relative to shaft O in the direction indicated by arrow 31, the arm 16 can be deflected inwardly by engagement with a rib 24 to allow the rib to pass thereby. Thus, the result of such a movement of the grille is simply to cause the ribs 24 to successively deflect and pass by the arms 16, again effectively decoupling the shaft from the grille.

It will be appreciated that the spring 21, in addition to performing the described function in connection with the clutching of the grille to the shaft O, also limits the forward movement of the grille 17 by engagement of the spring with a front face of hub 18. As shown in FIG. 1, the end of the skirt 23 is closed, by a closure of plate 18a, so that the working parts of the clutch mechanism are closed off.

In use, the helical air flow from the fan blades F passes through the vanes 11 and is thereby rendered more axial or "straightened". The air then passes through and is deflected by the grille louvres 20. If the grille 17 has been pulled into the drive position, the rotating grille will direct the air in a distribution pattern substantially the same as that of a gyratory head fan. The only substantial difference in the air flow produced is that it is more laminar or axial rather than helical as in known gyratory head fans. This, of course, is an advantage rather than a disadvantage.

Using the particular louvre arrangement described above, the air flow pattern produced was mapped in a standard test and it was found that the area covered was of slightly larger diameter than that of an equivalent gyratory head fan. The air flow pattern includes a central region of the total area covered in which the air is moving at all times.

If a continuous air stream is required in one direction, the grille 17 is pushed in to disengage the clutch. It will be evident from the drawings that the hub 18 is shaped so as to be capable of being conveniently gripped.

We claim:

1. A fan comprising a casing; a cylindrical wall defining an air passage through said casing, said air passage having an air inlet and an air outlet; a fan blade assembly mounted within said casing at the inlet end of said air passage; a motor mounted within said air passage for driving said fan blade assembly; an air directing grille mounted for rotation in the path of air flow downstream of the fan blade assembly at the air outlet; speed reducing means driven by the output of said motor opposite said fan blade assembly; a clutch mechanism coupling said speed reducing means to said grille for rotating said grille at a speed less than that of the fan blade assembly, said grille including a plurality of louvers arranged to direct the air flow in a substantially gyratory distribution pattern, said clutch having means permitting the output of said speed reducing means to continue rotation without imparting rotational movement to said grille when a predetermined restraint of rotation of said grille is applied thereto, said grille being movable axially of said casing and said casing having an annular portion engageable by an outer annular portion of said grille upon axial movement of said grille toward said casing annular portion; and retaining means operable to hold said grille annular portion against said casing annular portion by applying at least said predetermined restraint to said grille to permit locking of the grille without switching off said motor.

2. A fan according to claim 1 wherein said retaining means includes releasable locking means comprising a coaxially mounted ring and a plurality of axially extending resilient prongs connected to said hub, said prongs having beads to their free ends and being disposed to cooperate with said ring to effect the releasable locking action.

3. A fan comprising a fan blade assembly, a motor for driving the fan blade assembly, means to render the air flow from the blade assembly more axial, and an air directing grille mounted in the path of the air flow from the fan blade assembly and said means, a clutch mechanism operable to couple a first member which is, in use of the motor, axially rotatable thereby, and a second coaxially mounted member in the form of a hub carried by the grille for rotating or allowing rotation of the grille at a speed less than the blade assembly speed, said grille including a plurality of louvers arranged to direct the air flow in a substantially gyratory distribution pattern; said clutch mechanism including said members, and a drive transfer element in the form of a helical spring coaxially mounted over an axially extending portion of said first member, the inner surface portion of the spring element being frictionally engaged with the outer surface of said axially extending portion for transfer of rotational movement of the first member to the spring, the helical spring having an end portion which extends radially outwardly of the axis of the first member, the second member having an abutment positioned to be engaged by said end portion of the spring, during rotation of the first member and spring, to cause or permit rotation of the second member therewith, the frictional coupling between the spring and said axially extending portion being such as to permit said first member to rotate, in a given direction of rotation of said grille and first member, without imparting rotational movement to the spring when a predetermined restraint of rotation of the second member is applied, the grille being movable axially of said first member and the fan having an annular casing portion which is engageable by an outer annular portion of the grille, upon axial movement of the hub in one direction from a position in which the clutch mechanism is free to drive the grille; releasable locking means being provided operable to maintain said annular portion and casing portion so engaged to apply at least said predetermined restraint to the first member to permit locking of the grille without switching off said motor.

* * * * *